J. LEE.
SPRING WHEEL.
APPLICATION FILED MAY 16, 1908.
964,979.
Patented July 19, 1910.
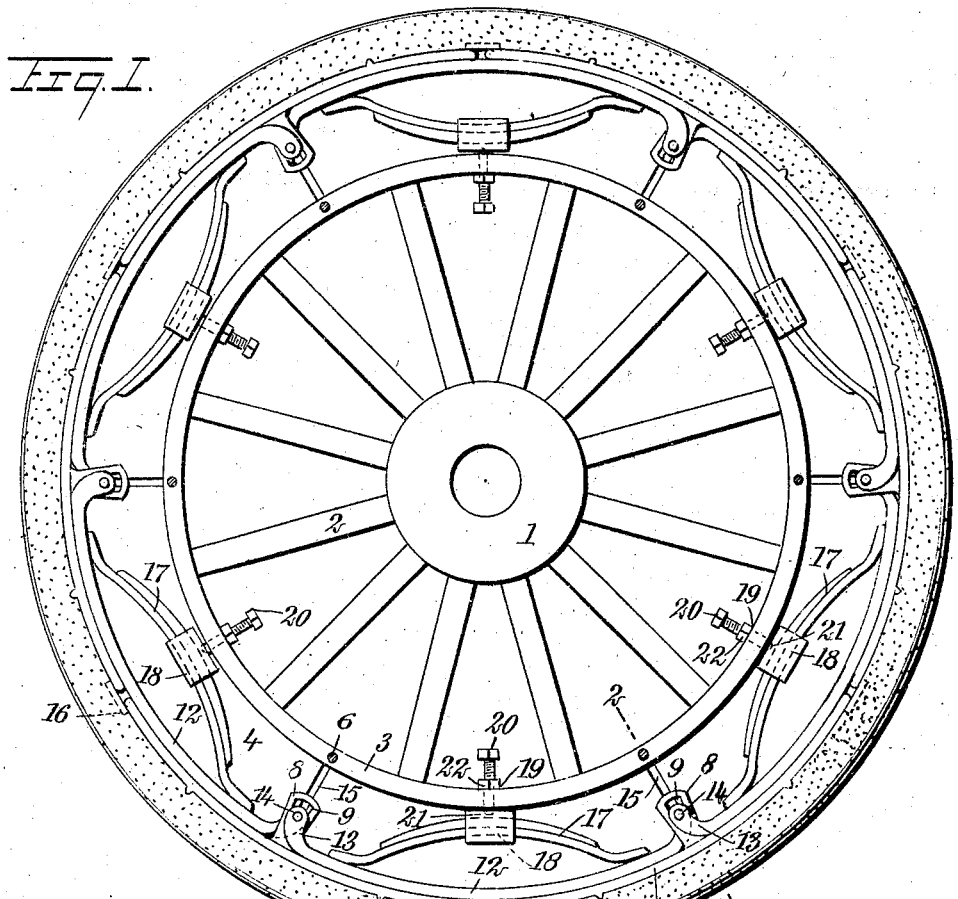
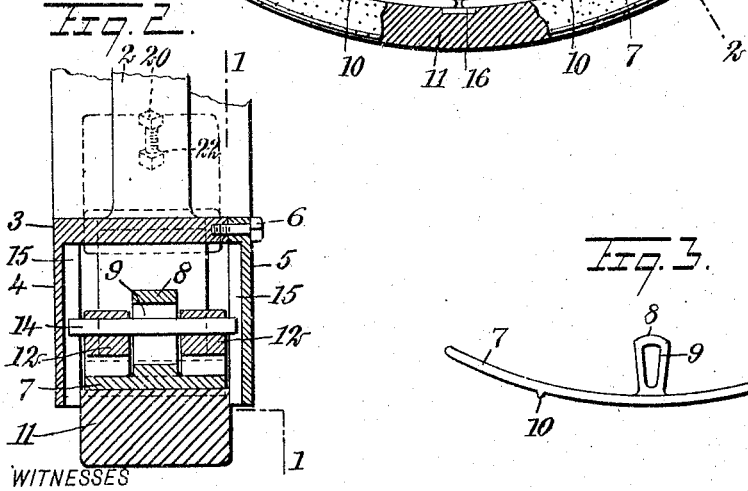
WITNESSES
H. Walker
INVENTOR
John Lee
BY Munn & Co.
ATTORNEYS

UNITED STATES PATENT OFFICE.

JOHN LEE, OF OELWEIN, IOWA.

SPRING-WHEEL.

964,979.

Specification of Letters Patent. Patented July 19, 1910.

Application filed May 16, 1908. Serial No. 433,172.

*To all whom it may concern:*

Be it known that I, JOHN LEE, a citizen of the United States, and a resident of Oelwein, in the county of Fayette and State of Iowa, have invented a new and Improved Spring-Wheel, of which the following is a full, clear, and exact description.

This invention relates to spring wheels, and more particularly such as have a channeled inner or spoke rim, an outer sectional rim and adjustable resilient shock absorbing means arranged between the spoke rim and the outer rim, the latter serving to carry the tire.
The object of the invention is to provide a device of the class described having resilient means for absorbing shocks due to the irregularities in the road, thus obviating the use of pneumatic tires, and the objections incident to the employment thereof.

The invention consists in the construction and combination of parts to be more fully described hereinafter and particularly set forth in the claims.
Reference is to be had to the accompanying drawings forming a part of this specification, in which similar characters of reference indicate corresponding parts in all the figures.
Figure 1 is a longitudinal section on the line 1—1 of Fig. 2; Fig. 2 is a cross section on the line 2—2 of Fig. 1; and Fig. 3 is a side view of one of the sections of the outer rim.
Before proceeding to a more detailed description of my invention, it should be understood that my device obviates the necessity of using pneumatic tires on vehicles, and thereby eliminates many of the difficulties so common to that type of tire. Further, either a tire of solid rubber or other suitable material may be used with my wheel, according to the conditions to be encountered, as means are provided whereby the tires may be easily detached.

In general, my spring wheel includes an outer sectional rim whose sections are movably secured between the sides of a channel-shaped spoke rim. Located between the outer rim and the spoke rim are adjustable springs for absorbing shocks caused by the irregularities of the road.

The tire is arranged about the outer rim, and is securely held in position by the outward pressure of the springs.

Referring more particularly to the drawings, 1 represents a hub having spokes 2 extending outwardly to an inner or spoke rim 3; the latter is provided with radially extended sides 4 and 5 respectively. The side 5 is removably held in position by means of bolts 6 or the like. Arranged between the sides of the spoke rim are the sections 7 of the outer rim, and each section being provided at its center with a guide 8 having an opening 9. Transverse ribs 10 are located on the outer side of each section, the latter being curved to conform to the curvature of the wheel tire. These ribs are adapted to engage grooves in the inside of the tire 11 to secure the latter against creeping.

Arranged upon the inner faces of the sections are resilient yokes 12; each yoke extends from one section to another and has the ends respectively located at opposite sides of the guides of the adjacent sections. The extremities of the yoke members are suitably laterally disposed for this purpose. The arrangement is such that an end of a yoke member is positioned at each side of each guide, and these adjacent yoke members are pivotally connected by pins 14 extending through the openings 9 of the guides. Recesses 15 on the sides of the spoke rim receive the ends of the pins 14 to permit their moving freely, and act as guideways therefor. Plates 16 are provided at the adjacent ends of the sections so as to form a bearing surface, and are seated in recesses in the tire.

Arranged between the yokes 12 and the spoke rim 3, are leaf springs 17 having sleeves 18 at their centers. Located in suitable openings 19 in the spoke rim are adjustable screws 20, the ends 21 of which engage recesses in the sleeves 18. By rotating the screws the springs may be adjusted to any suitable tension. A lock nut 22 is provided on the shank of the screw for locking the latter in position.

It will be observed that each of the yokes has its ends bent inwardly, and pivotally connected to the end of the adjacent yoke. With this construction when the central portion of the yoke meets with an obstruction, said central portion may bend inwardly, this movement being permitted by the manner in which its ends are connected swings on the pivots 14, and away from the end of the yoke to which it is connected. If the obstruction is at the point of pivotal connection, the pivot moves inward, which movement is permitted by the same construction, in this case, however, the connected inwardly bent ends swing toward each other, while in the movement previously described they move from each other or separate.

Having thus described my invention, I claim as new and desire to secure by Letters Patent:

1. A vehicle wheel comprising a spoke rim having flanges on its sides, one of said sides being removable, an outer sectional rim having its sections arranged between the sides of said rim and adapted to move radially, guides located upon said sections, resilient yokes carried by said sections and adapted to extend from one section to the adjacent section, means for pivotally connecting the adjacent ends of pairs of said yokes, said means engaging said guides, and resilient shock absorbing means between said yokes and said spoke rim.

2. A vehicle wheel comprising a spoke rim having flanges on its sides, one of said sides being removably secured in position, an outer sectional rim having its sections arranged between the sides of said rim and adapted to move radially, resilient yokes carried by said sections and extending from one section to the adjacent section, means for connecting the adjacent ends of pairs of said yokes, said spoke rim having radial guideways controlling said last mentioned means and cushioning devices between the rims.

3. A vehicle wheel comprising a spoke rim having flanges on its sides, one of said sides being removable, an outer sectional rim having its sections arranged between the sides of said rim and adapted to move radially, guides having eyes located upon said sections, resilient yokes carried by said sections and adapted to extend from one section to the adjacent section, a connecting member pivotally securing the adjacent ends of pairs of said yokes, said connecting member extending through the eyes of said guides and having projections beyond said yokes, said sides of said rim having recesses for receiving said projections of said connecting means and constituting guideways therefor, and a tire arranged about said outer rim.

4. A vehicle wheel comprising a spoke rim having flanges on its sides, an outer sectional rim, the sections having guides and being movable radially, resilient yokes carried by said sections, the adjacent ends of each pair of said yokes being arranged on opposite sides of one of said guides, members for pivotally connecting the adjacent ends of said yokes and adapted to pass through said guides, a tire arranged about said outer rim, and adjustable resilient shock absorbing means located between the sides of the spoke rim and engaging said yokes and said rim.

In testimony whereof I have signed my name to this specification in the presence of two subscribing witnesses.

JOHN LEE.

Witnesses:
FRANK E. LUCAS,
O. C. STEBBINS.